DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 6

T903,010
PHOSPHORUS-FREE CLEANING FORMULATIONS
Richard D. Katstra, Englewood Cliffs, N.J., assignor to Continental Oil Company, Ponca City, Okla.
Filed Sept. 22, 1971, Ser. No. 182,883
Int. Cl. C11d *1/18*
U.S. Cl. 252—546
No Drawing. 19 Pages Specification

A liquid, phosphorus-free cleaning formulation comprising a nonionic surface active agent in combination with an alkali cleaning compound or in combination with an amino polycarboxylic acid salt as a sequestering agent. Alternatively, a high level (from about 40 weight percent to about 70 weight percent) of the nonionic surfactant in an aqueous alcohol diluent may be employed without the inclusion of detergency builder compounds, sequestering agents or hydrotropes.